C. TYRRELL.
Barrel-Heading Press.
No. 223,303.  Patented Jan. 6, 1880.
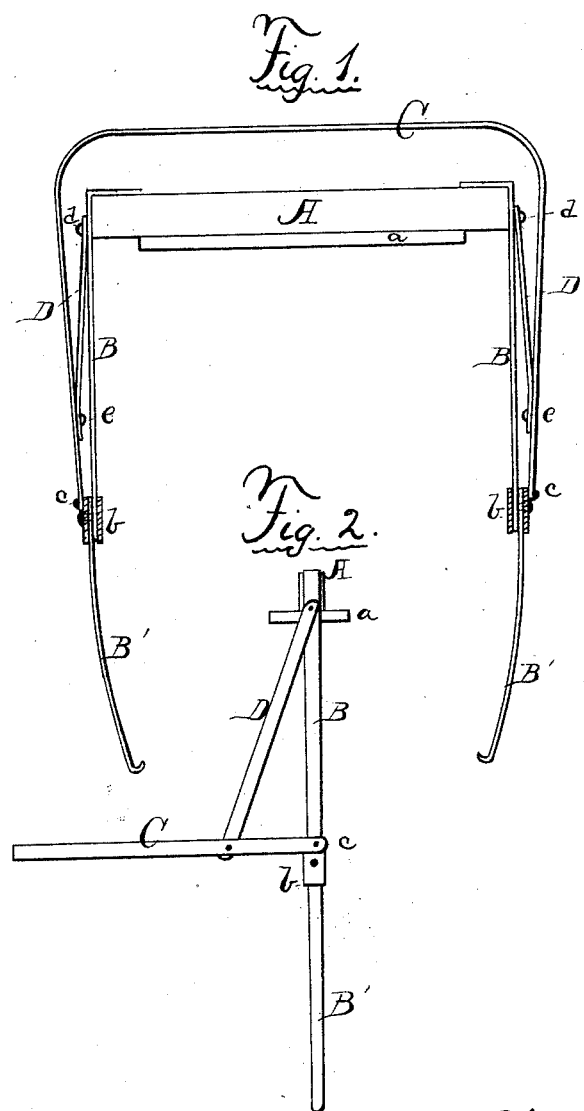

UNITED STATES PATENT OFFICE.

CHARLES TYRRELL, OF CORFU, NEW YORK.

BARREL-HEADING PRESS.

SPECIFICATION forming part of Letters Patent No. 223,303, dated January 6, 1880.

Application filed November 29, 1879.

*To all whom it may concern:*

Be it known that I, CHARLES TYRRELL, of Corfu, in the county of Genesee and State of New York, have made certain Improvements in Barrel-Heading Presses, of which the following is a specification.

This invention relates to devices for holding down the heads of fruit and other barrels while the loose pieces forming the head are nailed in, or, in other words, heading the barrel; and the invention consists in attaching the side pieces firmly to the follower, the lower ends running in slides or loops, the latter having fastened thereto the hooked pieces or legs, which catch onto the lower ends of a barrel, and with the operating handle or bail pivoted to the slides or loops, and with side straps or levers pivoted to the bail, and also at the upper ends, through the side pieces into the follower, all as hereinafter fully explained.

In the drawings, Figure 1 is a front view of the device, the slides in section; Fig. 2, a side view, in section, showing the position when the follower is pressed down.

A is the presser-head, and $a$ the follower or part that holds the barrel-heads down, the stave ends of the barrel coming up outside of it. B B are the side bars, of metal, and firmly fastened to the ends of the head A and projecting down and passing through slides or loops $b\ b$, to which are attached the hooked extensions B' B' or legs of the side bars, B, by a pin, $c$. The same pivot or pin that fastens the loops $b$ to the legs B' also attaches the lower ends of the bail C to the loop at $c$, where it swings.

At a short distance from the pin $c$ are pivoted short side straps, D D, their upper ends pivoted through the side bars, B, into the side of the presser head A at $d$, and the lower ends to the bail at $e$. These, in combination with the bail C, act as levers, so that when the bail is pulled down the side straps draw down the presser and follower A $a$, the ends of the side bars, B B, sliding down in the loops $b\ b$, the hooked legs B' B' holding and drawing tightly on the ends of the barrel while the head of the barrel is nailed in; then the bail is lifted up, as in Fig. 1, and the whole taken off, ready to put on the next barrel.

By this device a direct downward and even pressure from the follower is had on the loose heads of the barrel, and they are kept evenly in place while being nailed in.

The bail will work either side of a barrel.

I claim—

In a barrel-heading press, the side bars, B B, fastened directly to the head A, the lower ends moving up and down in the slides $b\ b$, the short hooked legs B' B', fastened to the slides $b\ b$, the bail C, pivoted thereto, and the lower short side levers, D D, pivoted to the bail at $e$ and to the head A of the follower, all substantially as set forth.

In witness whereof I have hereunto signed my name in the presence of two subscribing witnesses.

CHARLES TYRRELL.

Witnesses:
J. R. DRAKE,
T. H. PARSONS.